United States Patent Office 3,799,836
Patented Mar. 26, 1974

3,799,836
DEVITRIFIED GLASS WITH FIBROUS CRYSTALS IN PARALLEL RELATIONSHIP
Philip Sydney Rogers and James Williamson, both c/o The Imperial College of Science & Technology, London SW. 7, England
Filed Mar. 14, 1972, Ser. No. 234,486
Claims priority, application Great Britain, Mar. 18, 1971, 7,167/71
Int. Cl. C03b 29/00
U.S. Cl. 161—1
13 Claims

ABSTRACT OF THE DISCLOSURE

A devitrified silicate glass element comprising closely packed individual fibrous crystals lying in parallel relationship to one another along the length of the element is prepared by the controlled heat treatment of an elongated silicate glass element containing one or more crystal growth catalysts. The devitrified glass element may be disintegrated to provide individual fibrous crystals at least 3 mm. long and having a diameter less than 1 μm.

BACKGROUND OF THE INVENTION

Figure 1:
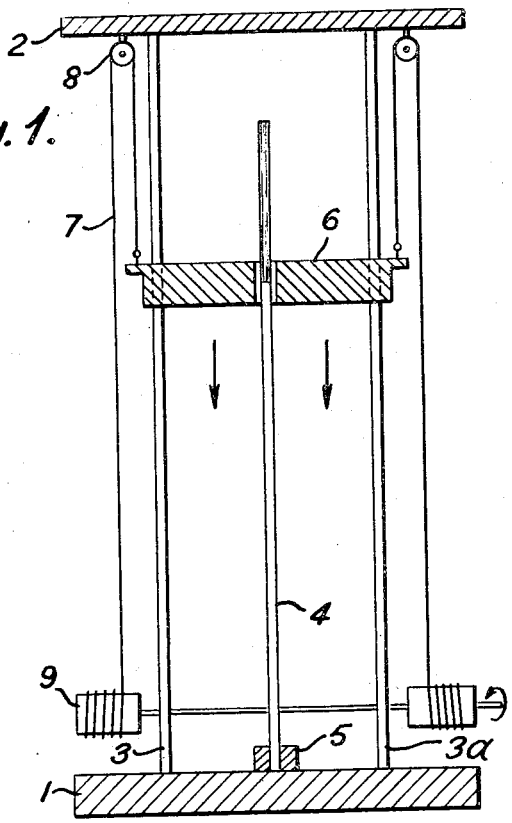

This invention relates to glass products and particularly to devitrified glass products and methods of producing such products. We have found that silicate glasses can be crystallized to yield a material which consists of closely packed fibrous crystals which lie parallel to one another. The silicate glasses are those in which the first major crystalline phase or phases to appear during devitrification has or have a fibrous habit. The individual fibrous crystals are at least 3 mm. long.

Individual crystals have previously been produced from silicate glass, but these were always comparatively short crystals having a maximum length of about 2 mm. Further, it would not appear that devitrified silicate glass elements in which the fibrous crystals all lie parallel to one another have been produced.

SUMMARY OF THE INVENTION

The present invention provides a method of producing a devitrified silicate glass element comprising closely packed individual fibrous crystals lying in parallel relationship to one another along the major axis of the element by inducing nucleation at one end of an elongated silicate glass element and thereafter inducing the growth of fibrous crystals along the major axis of the element, the element being formed of a silicate glass composition which comprises one or more crystal growth catalysts. The growth of fibrous crystals in the element is induced by heating the element at the end where nucleation has been induced to a temperature of from 850° to 1100° C. and thereafter progressively heating each successive portion of the element along its major axis at a rate substantially equal to the rate of crystal growth in the element. The individual fibrous crystals which may be separated from the element are at least 3 mm. along and have a diameter less than 1 μm.

DESCRIPTION OF THE INVENTION

The invention provides an elongated divitrified silicate glass element comprising closely packed individual fibrous crystals lying in parallel relationship to one another along the major axis of the element. The elements generally consist essentially of overlapping, parallel individual fibrous crystals, which are generally less than 1 μm. in diameter and up to several centimeters long. In certain circumstances glass residues or small quantities of non-fibrous crystalline material may be present between the fibrous crystals.

The invention also provides a method of producing a devitrified glass element in accordance with the invention, which method comprises inducing nucleation at one end of an elongated glass element and thereafter inducing the growth of fibrous crystals along the major axis of the element, the element being formed of a silicate glass composition which comprises one or more crystal growth catalysts.

The elements of the invention may for example be in the form of rods, bars or fibres. For example, the elements may conveniently be in the form of a rod having a diameter of at least 5 mm. a major:minor axial ratio of less than 50, or a fibre having a diameter of up to 1 mm.

The rods or bars of the invention could find applications as components whose electrical and mechanical properties (such as tensile strength) are strongly directional. The fibres may for example be used as fillers in materials such as cement or concrete, metals, glass-ceramics, ceramics, or plastics compositions. The fibres could be used as a replacement for natural asbestos fibres in that they would be less expensive to produce and present no health hazard. Also, the material is anhydrous, unlike natural asbestos, and it would therefore have better high temperature properties as compared to natural asbestos.

The elements of the invention may be crushed or milled and individual fibrous crystals may be separated from the crushed or milled material. In this invention the crystals are commonly about 2 cm. long and generally have lengths in the range 3 mm. to 3 cm. or more. Thus, the invention also includes individual fibrous crystals of devitrified silicate glass having lengths of at least 3 mm., preferably 3 mm., to 3 cm. and diameters less than 1 μm.

These individual crystals are linear or substantially linear and are of generally circular cross-section. The crystals may be used in the same ways as indicated above in the case of fibres.

In producing the elements of the invention, a base glass composition containing one or more crystal growth catalysts as an additive is first prepared.

The base glass composition usually contains $SiO_2$ and CaO and preferably also contains $Al_2O_3$ and/or MgO and/or $Na_2O$. Preferably the composition contains: 40–62% $SiO_2$, 25–43% CaO, 0–10% MgO, 0 to 10% $Na_2O$, and 0–23% more preferably 10 to 23% $Al_2O_3$, the percentages being by weight on the weight of the base composition. The composition may also contain an additive, such as $K_2O$ which reduces its melting point and lowers the temperature necessary in the heat treatment step referred to below.

The crystal growth catalyst is generally used in an amount of up to 10% by weight of the base composition. Preferably, a transition metal oxide catalyst is used (by transition metals we means those members of the Periodic Table which have partly filled d or f electron shells and the members of the Periodic Table in Groups I–B and II–B). The effectiveness of any particular transition metal oxide as a crystal growth catalyst depends on many factors, such as its valency or coordination state, and there may be certain oxides which possess no useful catalytic activity. The general function of the catalyst is to promote crystal growth in the desired direction without at the same time increasing internal nucleation of crystals or the nucleation of crystals at other surfaces of the element. If necessary, steps may be taken to prevent the nucleation of crystals at surfaces where it is not desired by chemical treatment of those surfaces at elevated temperatures. This may be achieved by the exchange of cations in the surface with small ionic radius by cations of larger ionic radius, so that the surface is under compression. It may also be achieved by coating the surface of the glass element by a glass of another composition in which the rate of crystal growth is relatively slower. This undesired nucleation remains at a relatively low level as compared to the desired crystal growth. In any case of doubt a simple experiment can be performed to test whether or not a particular transition metal oxide performs the required function.

We have found that FeO and ZnO are particualrly effective catalysts. They are preferably used in amounts of 5–7% by weight. Another effective catalyst is $V_2O_5$ which is preferably used in an amount of 1–4%.

Other groups of compounds which can be effective as crystal growth catalysts are fluorides and phosphates. Examples of such catalysts are the fluorides and phosphates of Na, K, Mg and Ca.

The base glass composition containing the catalyst is fabricated into an elongated element (such as a glass rod, bar or fibre) by conventional techniques and the element is then treated in accordance with the method of the invention to produce the devitrified product.

First, nucleation is induced at one end of the element. This may be effected by physically or chemically changing the end of the element, for example by abrasion or chemical treatment to alter the composition. The desired crystal growth along the major axis of the element may then be produced by controlled heat treatment.

This heat treatment is generally carried out at a temperature of 850° C. to 1100° C., preferably 900 to 1050° C. The temperature of heat treatment appropriate to a particular glass composition is chosen to give the maximum rate of crystal growth without undesired deformation. The preferred technique is to move the element along the direction of its major axis through a hot zone at a rate similar to the rate of crystal growth. The hot zone may, for example, be provided by an electrical heater arranged around the element, by radial gas jets or by a focussed beam of radiant heat. Alternatively, the element may be fixed and the heating means moved along its length.

Figure 2:
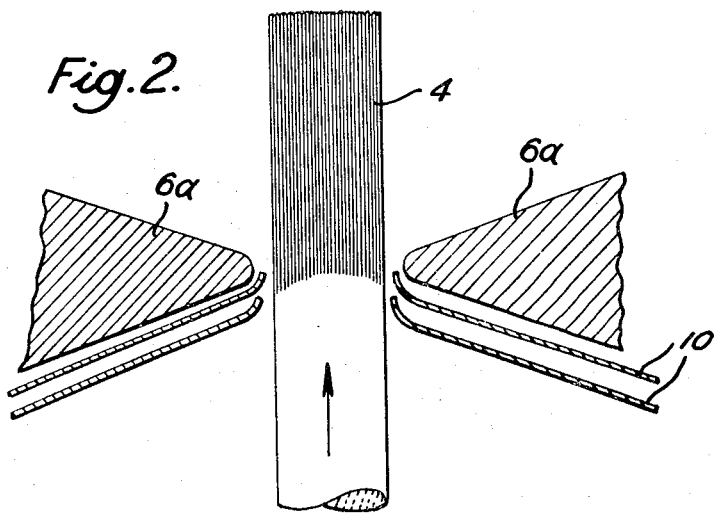

The invention is further illustrated with reference to the accompanying drawings wherein:

FIG. 1 is a sectional view of apparatus used for the preparation of a devitrified glass rod in accordance with the method of the invention; and FIG. 2 shows in section a heating element arranged to provide a narrow hot zone in a glass rod. Both figures which are schematic are not drawn to scale.

In FIG. 1, a frame is shown having a flat base 1 above which is a horizontal cross-member 2 supported by two vertical columns 3, 3a. A glass rod 4 standing on the base of the frame is clamped vertically between the base and the cross-member by clamping means 5 situated at the lower end of the rod. An annular heating element 6 is disposed around the glass rod so that the rod projects through the central opening in the heating element. The heating element is supported at two points along its uppermost periphery by a wire 7, attached to each point. Each wire passes over a pulley 8, attached to the underside of the cross-member 2 and the free end of each wire is connected to the drum 9 of winding means not shown. The heating element support system allows controlled movement of the heating element upwardly and downwardly along the length of the glass rod.

When employing the apparatus illustrated, the glass rod to be devitrified is clamped as described with the end of the rod at which nucleation has been previously induced pointing upwards. The heating element is positioned level with the upper end of the rod and heat is applied to the rod. The heating element is then lowered by the winding mechanism at a rate equal to the crystal growth in the glass rod until substantially the whole rod has been devitrified.

FIG. 2 shows the portion of a preferred heating element 6a immediately adjacent a glass rod 4. The heating element is tapered inwardly towards the rod so that the rod is heated over a very short part of its length. The arrow indicates the direction of movement of the rod relative to the heating element and the shaded portion of the rod shows that part of the rod which has been devitrified. Spaced below the heating element 6a are two reflecting heat shields 10 which serve to concentrate the heat in the heating zone.

Examples of base glass compositions which can be devitrified in accordance with the invention:

TABLE 1

| Example | 1 | 2 | 3 | 4 |
|---|---|---|---|---|
| Constituents (percent by wiehgt): | | | | |
| CaO | 30 | 31 | 28 | 29 |
| MgO | 2 | 4 | 10 | |
| $Al_2O_3$ | 15 | 17 | 20 | 8 |
| $SiO_2$ | 53 | 48 | 42 | 58 |
| $Na_2O$ | | | | 5 |

Examples of crystal growth catalysts added to the base glass compositions shown in Table 1 are given in Table 2. The proportion of crystal growth catalyst is calculated as a weight percentage of the base glass composition.

TABLE 2

| Example numbers of Table 1 | Crystal growth catalyst | Percent |
|---|---|---|
| 1a | FeO | 7 |
| 1b | $V_2O_5$ | 3 |
| 2 | ZnO | 7 |
| 3 | FeO | 5 |
| 4 | $CaF_2$ | 6 |

The following is an example illustrating the production of a devitrified glass rod in accordance with the invention.

EXAMPLE 5

A composition having the constitution shown in Example 1a of Tables 1 and 2 and containing 7% by weight of FeO was fabricated into the form of a glass rod 10 cm. in length and 5 mm. in diameter. One end of this rod was abraded with silicon carbide grit to induce nucleation at the end. The rod was then heat treated to induce crystal growth along its major axis by passing it through an annular heating element, the roughened end of the rod being passed through the heating element first. The heating element was arranged to provide a narrow hot zone in the rod. The maximum temperature of this one was 1010° C. at its center and the temperature at points 3 mm. on either side of the center was 960° C. The rod was passed through the heating element in an axial direction at a rate (0.14 mm. per minute) which kept pace with the crystal growth. The treatment was completed in 12 hours.

The treated rod was found to consist essentially of fibrous crystals lying in closely packed parallel relationship along the major axis of the rod.

All of the compositions in Tables 1 and 2 can be similarly processed to yield similar products.

In Examples 1, 2 and 3 the fibrous crystals are an intimate mixture of wollastonite and anorthite. In Example 4 the fibrous crystals are of wollastonite and fluor-pectolite together. In examples not cited, wollastonite is the only fibrous crystalline phase, and in others fluor-xonotlite appears with either wollastonite or fluor-pectolite.

The crystalline phases mentioned above are all capable of some composition variation by solid solution. Their commonly used chemical formulae are as follows:

Wollastonite _____ $CaO \cdot SiO_2$.
Anorthite _____ $CaO \cdot Al_2O_3 \cdot 2SiO_2$.
Fluor-pectolite _____ $2CaO \cdot 3SiO_2 \cdot NaF$.
Fluor-xonotlite _____ $5CaO \cdot 6SiO_2 \cdot CaF_2$.

We claim:

1. A method of producing a devitrified silicate glass element comprising closely packed individual fibrous crystals lying in parallel relationship to one another along the major axis of the element which method comprises
  (i) inducing nucleation at one end of an elongated glass element formed of a silicate glass composition which comprises one or more crystal growth catalysts;
  (ii) heating said end of the element to a temperature of from 850° to 1100° C.; and
  (iii) progressively heating each successive portion of the element along its major axis at a rate substantially equal to the rate of crystal growth in the element in order to develop fibrous crystals lying in parallel relationship to each other.

2. A method according to claim 1 wherein the element is heated to a temperature of from 900° to 1050° C.

3. A method according to claim 1 wherein the silicate glass composition comprises from 40 to 62 weight percent $SiO_2$, from 25 to 43 weight percent CaO, from 0 to 23 weight percent $Al_2O_3$, from 0 to 10 weight percent MgO and from 0 to 10 weight percent $Na_2O$.

4. A method according to claim 3 wherein the silicate glass composition comprises from 10 to 23 weight percent $Al_2O_3$.

5. A method according to claim 3 wherein the silicate glass composition further comprises up to 10 weight percent of a crystal growth catalyst selected from the group consisting of transition metal oxides, fluorides or phosphates.

6. A method according to claim 3 wherein the silicate glass composition further comprises from 5 to 7 weight percent FeO as crystal growth catalyst.

7. A method according to claim 3 wherein the silicate glass composition further comprises from 5 to 7 weight percent ZnO as crystal growth catalyst.

8. A method according to claim 3 wherein the silicate glass composition further comprises from 1 to 4 weight percent $V_2O_5$ as crystal growth catalyst.

9. A method of producing a devitrified silicate glass element comprising closely-packed individual fibrous crystals lying in parallel relationship to one another along the major axis of the element which method comprises:
  (i) providing an elongated glass element formed of a silicate glass composition which comprises at least one crystal growth catalyst;
  (ii) heating an end of said elongated glass element to a temperature of from 850° to 1100° C.; and
  (iii) progressively heating successive portions of elements along its major axis at a rate substantially equal to the rate of fibrous crystal growth in the elements in order to develop fibrous crystals lying in parallel relationship to each other.

10. A method according to claim 9 wherein prior to heating the end surfaces of the element said end surface is abraded.

11. A method according to claim 9 wherein prior to heating the end surface of the glass element the chemical composition of said end surface is altered in order to assist nucleation of the end surface.

12. An elongated devitrified glass element made by the method of claim 12.

13. A product of claim 12, wherein the glass composition comprises from 40 to 62 weight percent $SiO_2$, from 25 to 43 weight percent of CaO, from 0 to 23 weight percent of $Al_2O_3$, from 0 to 10 weight percent MgO and from 0 to 10 weight percent $Na_2O$.

References Cited
UNITED STATES PATENTS

| | | | |
|---|---|---|---|
| 3,282,712 | 11/1966 | Kyuto et al. | 65—33 X |
| 3,298,553 | 1/1967 | Lusher | 65—33 X |
| 3,464,807 | 2/1969 | Pressau | 65—33 |
| 3,464,880 | 2/1969 | Rinehart | 65—33 X |
| 3,114,066 | 12/1963 | Allen et al. | 65—33 X |
| 3,713,854 | 1/1973 | Beal | 65—33 |

FRANK W. MIGA, Primary Examiner

U.S. Cl. X.R.

65—33, 1, 111